Jan. 25, 1944.   H. H. BLAU   2,339,975
METHOD OF MAKING GLASS ARTICLES
Filed Oct. 6, 1941
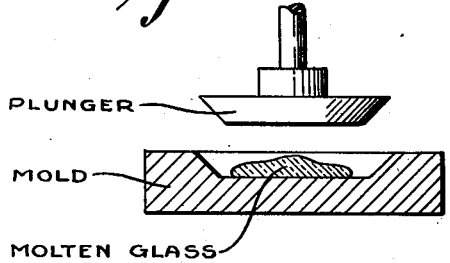
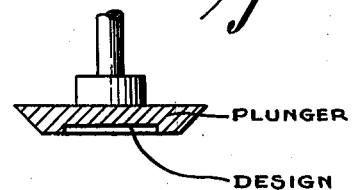
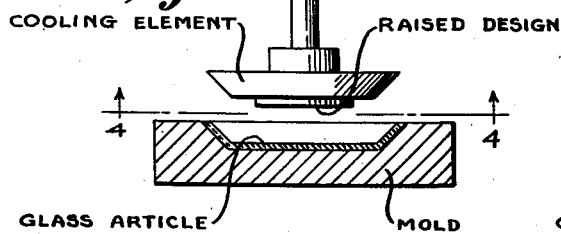
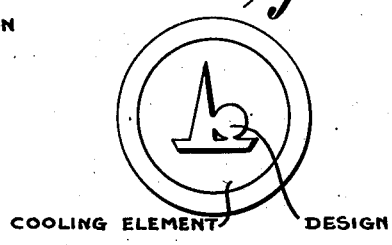
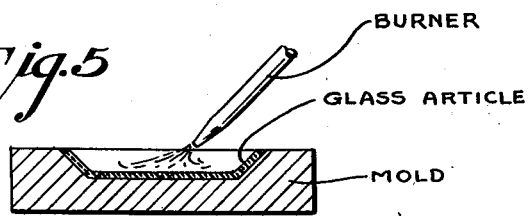
Inventor
HENRY H. BLAU
By F. H. Knight
Attorney Patented Jan. 25, 1944

2,339,975

UNITED STATES PATENT OFFICE 2,339,975

METHOD OF MAKING GLASS ARTICLES

Henry H. Blau, Bexley, Ohio, assignor to Corning Glass Works, Corning, N. Y., a corporation of New York Application October 6, 1941, Serial No. 413,900

4 Claims. (Cl. 49—79)

This invention relates to a method of making an article composed of thermally opacifiable glass, that is, glass which is normally clear but which may be opacified or rendered light diffusing by heating it to a suitable temperature or by retarding its rate of cooling. In my prior Patent 2,132,390, it is shown that the nuclei of the opacifying inclusions of such glass are formed only within a certain temperature range and that the inclusions can thereafter grow only when the glass is heated to within another temperature range which is higher than and substantially separate from the nuclei forming range. It is further shown that articles composed of such glass can be completely opacified by proper heat treatment within these temperature ranges.

The primary object of this invention is to opacify differentially an article made of such a glass, that is, to bring about opacification of selected portions of the article while maintaining other portions of the article substantially unopacified, or relatively less opacified than the selected portions.

Another object is to form an opacified design on a glass article.

Another object is to produce a glass article having opacified and unopacified areas in the glass so oriented as to form a design.

I have discovered that the above objects may be attained by forming an article of a thermally opacifiable glass and, while the article as a whole is at a temperature above the nuclei-forming range, cooling a selected portion of the article to a temperature within the nuclei-forming range and reheating the cooled portion to a temperature within the inclusion-growing range.

This may be accomplished advantageously in the manner and by the use of suitable devices shown in the drawing which illustrates but does not limit the invention and in which Fig. 1 is a side view partly in section of a mold containing a gob of thermally opacifiable glass and having a plunger positioned for pressing the gob in the usual manner, Fig. 2 is a sectional view of a modified plunger similar to that shown in Fig. 1, but having a design in intaglio.

Fig. 3 is a side view showing a section of a mold containing a pressed glass article, and a cooling element positioned above the article and having a raised design on the face thereof in accordance with my invention, Fig. 4 is a bottom plan view of the cooling element of Fig. 3 showing in full view a design on the face thereof, and Fig. 5 is a sectional view of a mold containing a pressed glass article and having a burner positioned for reheating the article in accordance with my invention.

In practicing the invention a thermally opacifiable glass, such as those described in the above mentioned patent and melted in the usual manner, is molded preferably by pressing with a conventional mold and plunger as shown in Figs. 1 and 2 to form an article, for example, the dish contained in the mold in Fig. 3. The pressing plunger is then removed and while the glass of the article as a whole is still in a highly heated state or at a temperature above the nuclei-forming range, a cooling element having any desired design as shown in Figs. 3 and 4 is brought into close proximity to the glass. Such cooling element is preferably composed of metal and, if desired, may in addition be provided with internal water cooling means (not shown). The design may be in relief as shown in Fig. 3, or may be an intaglio depending on which portion of the glass article is to be opacified. In either case only the raised portion of the face of the cooling element is brought into contact with the hot glass. Since the purpose of contacting the glass with the cooling element is merely to cool a selected area thereof, such contact should not be so severe as to distort the article.

A relatively short time, amounting to a few seconds, will usually suffice to lower the temperature of the contacted area to within the nuclei-forming range, after which the cooling element is removed and the glass article, particularly the cooled area, is reheated as by means of a burner as shown in Fig. 5. A relatively short heating suffices to raise the temperature of the previously cooled area to within the inclusion-growing range at which time opacity "strikes" into the portion which was cooled and the remainder of the article is substantially unaffected.

If desired, the entire article, after removal of the cooling element, may be permitted to cool briefly into the nuclei-forming range after which by a uniform reheating into the inclusion-growing range opacification will develop throughout, but the portion which was cooled will be more densely opacified. By this means an opacified design may be produced having a less densely opacified background, or vice versa.

As a specific example of the operation of my method, a thermally opacified glass in plastic condition at a temperature of about 1300° C. was placed in a mold which was at about 420° C. The pressing was accomplished with a quick stroke of the plunger and the hot glass article was immediately selectively chilled while in the mold with a cooling element which in this instance was similar in shape to the pressing plunger but was provided with a raised design on the face thereof. The design of the cooling element was in light contact with the glass for fifteen (15) seconds, after which the article was removed from the mold and reheated on a refractory table with a burner until the cooled area became opacified, the untreated areas remaining unopacified. The article was then annealed in the usual manner.

Unusual contrasting effects may be obtained by coloring the initial glass in the usual manner by the introduction of coloring oxides. The selectively opacified areas then appear more intensely white against a colored unopacified ground.

If desired, the design may be formed in relief on the glass article by providing the pressing plunger with a suitable intaglio as shown in Fig. 2. The cooling element may then be provided with a plane face or may have the same design in relief and is employed so that the raised design on the glass article is contacted therewith, thus providing the article with a raised opacified design after it has been reheated.

It will be apparent that my new method is applicable to glass articles other than those which are pressed or formed in molds and that it may be applied with advantage to sheet glass produced by various methods. Such embodiments fall within the scope of the invention as claimed.

I claim:

1. The method of making a glass article with an integral opaque design, which includes melting a thermally opacifiable glass the composition of which is such that the nuclei of the opacifying inclusions form and grow in separate temperature ranges, the nuclei-forming range being below the inclusion-growing range, forming an article therefrom, contacting a selected portion of the article with a cold metallic surface for a length of time sufficient to cool the contacted portion of the glass to a temperature within the nuclei-forming range while maintaining the remainder of the article above this range, reheating the selected portion to a temperature within the inclusion-growing range until the selected portion is opacified and thereafter cooling the article.

2. The method of making a glass article with an integral opaque design, which includes melting a thermally opacifiable glass the composition of which is such that the nuclei of the opacifying inclusions form and grow in separate temperature ranges, the nuclei-forming range being below the inclusion-growing range, pressing an article therefrom, contacting a portion of the article with a design formed in relief on a cold metallic surface for a length of time sufficient to cool the contacted portion of the glass to a temperature within the nuclei-forming range while maintaining the remainder of the article above this range, removing the metallic surface, reheating the contacted portion of the article to a temperature within the inclusion-growing range until the contacted portion is opacified, and thereafter cooling the article.

3. The method of making a glass article with an integral opaque design, which includes melting a thermally opacifiable glass the composition of which is such that the nuclei of the opacifying inclusions form and grow in separate temperature ranges, the nuclei-forming range being below the inclusion-growing range, pressing an article therefrom with a plunger having in its surface an intaglio design to form a design in relief on the article, contacting the raised design of the article with a cold metallic surface to reduce the temperature of the contacted glass to within the nuclei-forming range while maintaining the remainder of the article above this range, removing the metallic surface, reheating the design on the article to a temperature within the inclusion-growing range until the design is opacified and thereafter cooling the article.

4. The method of making a glass article with an integral opaque design, which includes melting a thermally opacifiable glass the composition of which is such that the nuclei of the opacifying inclusions form and grow in separate temperature ranges, the nuclei-forming range being below the inclusion-growing range, forming an article therefrom, contacting a selected portion of the article with a cold metallic surface for a length of time sufficient to cool the contacted portion of the glass to a temperature within the nuclei-forming range while maintaining the remainder of the article above this range, permitting the article as a whole to cool briefly to within the nuclei-forming range, reheating the article uniformly to a temperature within the inclusion-growing range until it is opacified and thereafter cooling the article.

HENRY H. BLAU.